United States Patent Office 2,727,229
Patented Dec. 13, 1955

2,727,229

RADAR NAVIGATIONAL SYSTEM FOR AIRCRAFT

James L. Anast, Xenia, and George T. Minshall, Wilmington, Ohio

Application August 7, 1950, Serial No. 178,160

3 Claims. (Cl. 343—11)

(Granted under Title 35, U. S. Code (1952), sec. 266)

The invention described herein may be manufactured and used by or for the Government for governmental purposes without payment to me of any royalty thereon.

This invention relates to radar navigational systems for aircraft and in particular to such systems in which map overlays are used in connection with the radar display to provide accurate navigation over the area covered by the map.

A known system of the above type employs a search radar station on the ground and a transponder beacon located in the airplane. The search radar station is provided with a plan position indicator, or PPI, display on which the airplane is represented as a spot of light having a position relative to the center of the display that is the same as the actual position of the airplane relative to the ground radar station. The screen of the cathode ray tube, on which the PPI display appears, is covered with a transparent map overlay properly oriented and with the location of the ground radar station on the map placed directly over the center of the PPI display. The final result is a map of the area surrounding the ground station with the position of the airplane thereon represented by a bright spot. This map is then transmitted to the pilot of the airplane by means of television. The only equipment required on the airplane is a transponder beacon and a television receiver, both relatively small pieces of equipment.

In military aircraft it may be more feasible to have the search radar located on the airplane and the transponder beacon on the ground. However, interchanging the ground and airborne stations in the above described navigational system would introduce two difficulties in that changes in the heading of the airplane would produce errors in the orientation of the map overlay and the airplane rather than the ground beacon would appear at the center of the PPI display.

It is the object of this invention to provide a radar navigational system of the above general type in which the search radar equipment and plan position indicator are air-borne and the transponder beacon is located on the ground, and in which the ground beacon appears at the center of the PPI display and the orientation of the map overlay is always correct regardless of the heading of the airplane. Means are also provided for producing a lubber line on the screen of the cathode-ray tube indicator to show the heading of the airplane.

In the proposed navigational system correct orientation of the map is obtained by introducing a correction in azimuthal direction of the cathode-ray tube sweep equal to the difference between the heading of the airplane and a fixed reference direction such as true or magnetic north. The apparent location of the ground transponder beacon at the center of the PPI display with the airplane indicated as a spot of light having the same position relative to the center that the airplane actually has relative to the beacon is made possible by arranging that the direction of the cathode-ray tube sweep be opposite to the direction of the antenna as referred to the PPI display.

A more detailed description of the invention will be given in connection with the accompanying drawings which show one embodiment thereof and in which Fig. 1 is a schematic diagram of the electrical and mechanical features of the invention;

Figure 1:
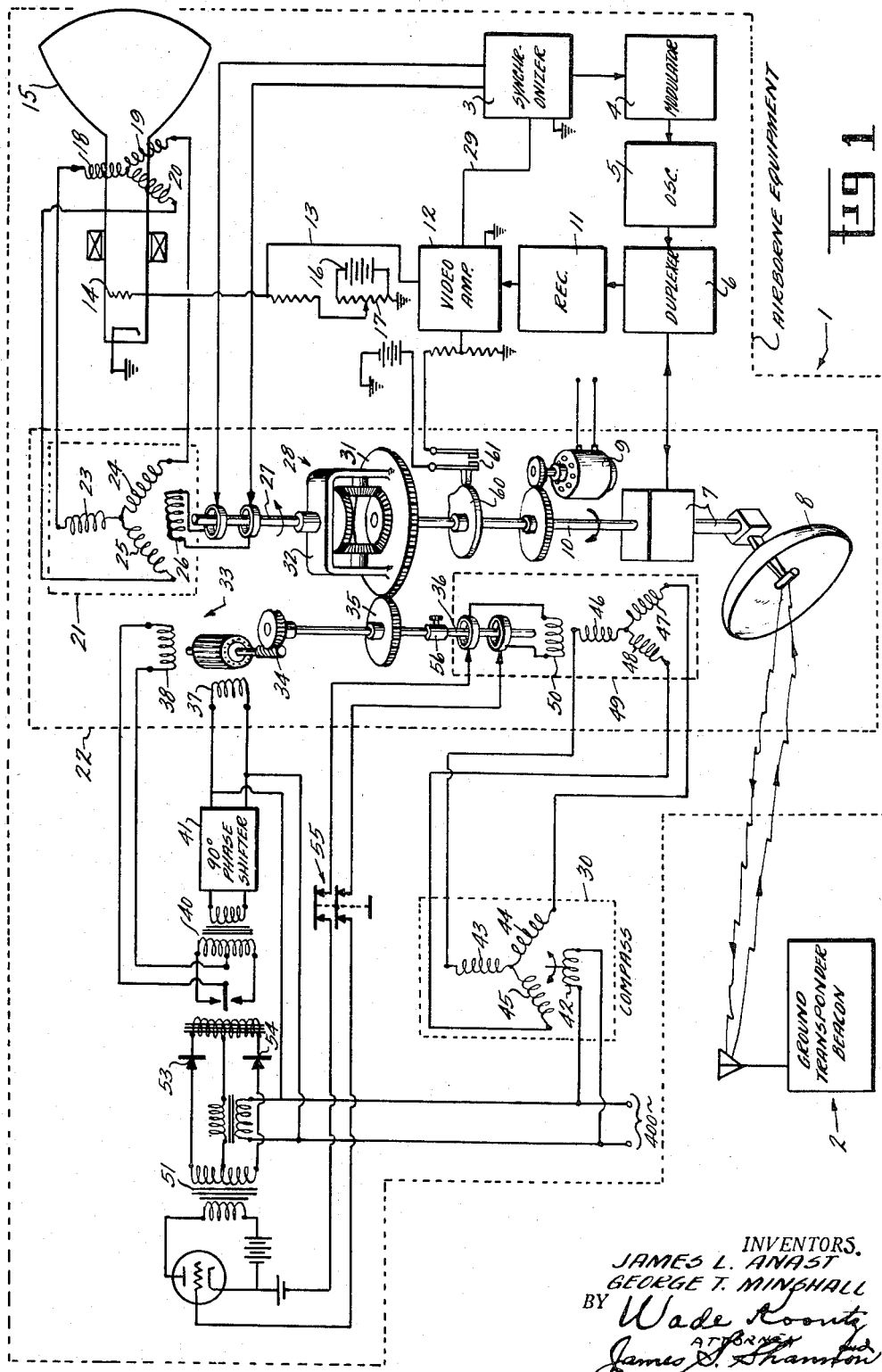

Referring to Fig. 1, the apparatus within the enclosure 1 is that part of the navigational system installed in the airplane. The ground part of the system is the transponder beacon 2. In the air-borne part, the synchronizer 3 generates short pulses at a constant repetition rate and applies these to modulator 4 which keys the power oscillator 5. The resulting train of short high powered pulses of high frequency energy generated by the oscillator are applied through duplexer 6 and rotating joint and transmission means generally indicated at 7 to antenna 8. The antenna 8 is designed for high directivity in the horizontal plane and is rotated at constant speed by motor 9 acting through shaft 10. When the antenna 8 points in the direction of transponder 2 the latter utilizes each received pulse to generate and radiate a corresponding pulse of higher power. The pulses radiated by the transponder 2 are received by antenna 8 and transmitted through the transmission means and rotating joint 7, and through duplexer 6, to receiver 11. The duplexer 6 is a device for directing received energy into receiver 11 and for preventing its dissipation in oscillator 5, and for directing the high level output of oscillator 5 to the antenna and for preventing its application to receiver 11 where it might cause damage. The construction and operation of the duplexer 6, the transmission and rotating joint means 7, the antenna 8 and the transponder beacon 2 are well known in the art and no further description of these elements here appears necessary.

The received pulses of high frequency energy applied to receiver 11 are demodulated therein to produce the video signal which is amplified in video amplifier 12 and applied over conductor 13 to the beam intensity control grid 14 of cathode-ray tube 15. The grid 14 is biased below the cut-off point by potential source 16 and potentiometer 17, however, the video signal is of sufficient strength to overcome this bias and unblank the beam of the tube.

The cathode-ray tube 15 is operated to produce a PPI display. In this type display the beam is deflected radially outward from the center each time a pulse of high frequency energy is radiated by antenna 8. At the same time the beam is rotated in step with the antenna so that the entire screen of the cathode-ray tube is radially scanned once for each revolution of the antenna. The deflection and rotation of the scanning beam is accomplished by the Y-connected deflection coils 18, 19 and 20 which are energized from the synchro 21, the latter forming a part of the antenna assembly 22. The synchro 21 has three Y-connected stator coils 23, 24 and 25, which supply energy to the above deflection coils, and a rotor coil 26 which rotates with shaft 27. Shaft 27 is driven by shaft 10 through differential gear 28, the function of which will be explained later.

Rotor winding 26 of synchro 21 is energized by a sawtooth wave of current which acts through windings 23, 24 and 25 and through windings 18, 19 and 20 connected thereto to produce a linearly varying flux which deflects the electron beam of tube 15 radially from the center of the cathode-ray tube screen. The azimuthal direction along which the deflection takes place is determined by the angular position of rotor winding 26 relative to stator windings 23, 24 and 25. Since shaft 27 rotates at the same speed as antenna 8 the direction of deflection changes through 360° during each rotation of the antenna. The reversed rotation of shaft 27, caused by differential gear 28, may be corrected for by interchanging any two of the three leads connecting the stator windings of synchro 22 to the deflection windings 18, 19 and 20. In the embodiment shown the connections between windings 24—25 and 19—20 have been interchanged so that clockwise rotation of antenna 8 produces clockwise rotation of the scanning beam.

The sawtooth wave for energizing winding 26 is generated by synchronizer 3. This element also synchronizes the sawtooth wave with the transmitted pulses so that the beam begins to sweep outward from the center of the cathode-ray tube screen at the instant a pulse is radiated by antenna 8. If the antenna is pointed toward beacon 2 return echo pulses will be received which increase the potential of grid 14 above the cut-off point thus producing a spot on the cathode-ray tube screen at a distance from the center proportional to the distance from the antenna to the ground beacon. In order to assist in determining range the synchronizer also may perform the function of supplying range marker pulses to grid 14. These pulses occur at regular intervals after initiation of the sweep and have a spacing equal to the time for a pulse of high frequency energy to travel twice a fixed distance, for example, five miles, plus the time consumed by beacon 2 in initiating a return pulse. The range marker pulses reach grid 14 through video amplifier 12 to which they are applied over conductor 29. The resulting concentric range circles produced on the screen of the cathode-ray tube may be seen in Fig. 3.

Figure 3:
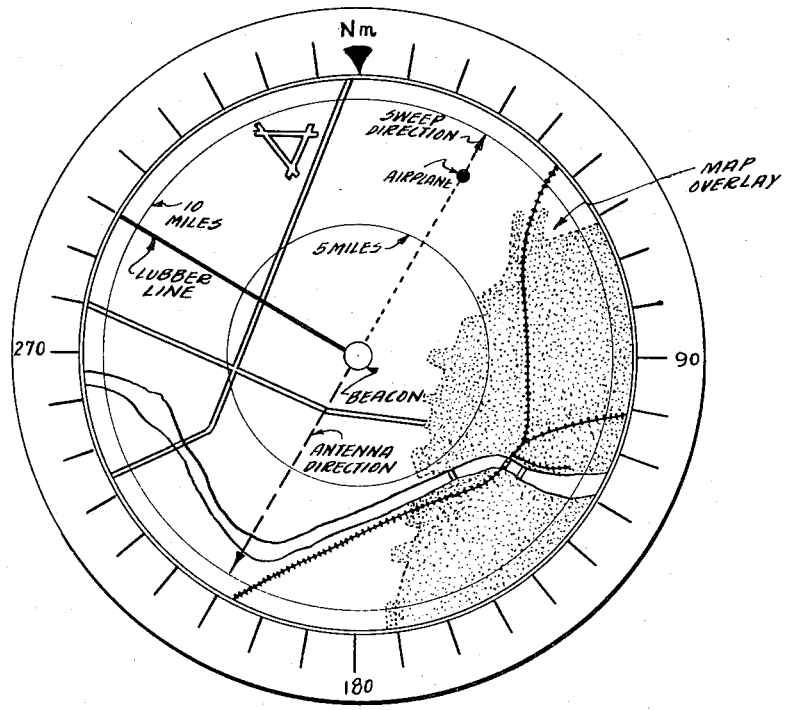
Fig. 3 shows how the situation of Fig. 2 would appear on a typical PPI indicator screen as used in a navigational system in accordance with the invention.

The cathode-ray tube 15 is fixed relative to the airplane and may have placed over its screen a transparent map of the area surrounding the ground beacon as shown in Fig. 3. The scale of the map must of course agree with the range scale of the sweep. Also, as shown, the screen may be surrounded by a graduated dial reading azimuths. Both the map and the dial are fixed relative to the tube and the airplane. Because of this fixed relationship it is necessary to compensate for the effect of changes in heading in the relative orientation of the map and radar information appearing thereon. This is accomplished by changing the direction of the sweep by an angle equal in sign and magnitude to the angular difference between the heading of the airplane and the reference direction which, in the embodiment shown, is magnetic north.

Figure 2:
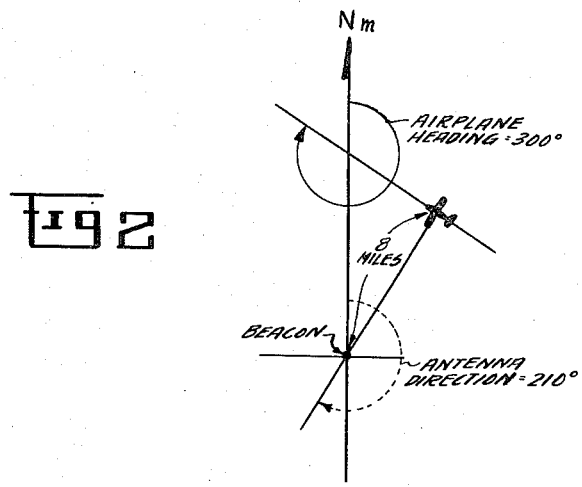
Fig. 2 is a diagram of a typical navigational situation.

The mechanism for effecting the above azimuth stabilization comprises the differential gear 28, the compass 30 and the associated control circuit. Before discussing the operation of this mechanism, however, the PPI display produced by tube 15 and the associated map overlay will be considered more fully, using the situation shown in Fig. 2 as an example. In this figure the airplane is flying a magnetic heading of 300° at a distance of eight miles from the ground beacon and the magnetic azimuth of the antenna when it is pointing in the direction of the beacon is 210°. Ordinarily when the search radar is air-borne and the beacon is located on the ground, the airplane appears always at the center of the PPI display and the beacon appears as a spot of light moving over the display as the airplane moves relative to the beacon. This is an inconvenience from the navigational standpoint since either the information in the display must be transferred to a map or else, if a map overlay is used, the position of the overlay must be continually changed in order to keep the location of the ground beacon on the map always in register with the moving spot representing the beacon on the PPI display. It would therefore be more desirable to have the location of the beacon always at the center of the display with the airplane represented by the moving spot since this would permit the map overlay to remain in one position on the face of the cathode-ray tube. In accordance with the invention this result is accomplished by arranging that the direction of the sweep be always opposite to the direction of the antenna as plotted on the map overlay. In general proper adjustment of the sweep direction may be made by placing the antenna 8 in a known direction and rotating winding 26 relative thereto until the direction of the sweep on the PPI display of Fig. 3 is opposite to that of the antenna. This condition is shown in Fig. 3 for the example in Fig. 2, the dashed line representing the antenna direction and the dotted line representing the direction of the sweep. Rotation of winding 26 relative to the antenna 8 may be accomplished by rotating gear 31 which together with support 32 attached thereto forms the differential carrier. In the case of a conventional PPI radar system in which the sweep and antenna directions are the same, the required opposite direction for the sweep can be simply obtained by reversing the phase of the sweep voltage applied to the deflection circuit. In a deflection system such as shown in Fig. 1 the phase of the voltage applied to winding 26 could be reversed for this purpose.

Considering in greater detail the operation of the azimuth stabilizing mechanism, rotation of gear 31 through a given angle rotates shaft 27 through twice the angle relative to shaft 10. The foregoing statement assumes that rotation of gear 31 will not produce any rotation of shaft 10. This requirement is met in the mechanism shown because of the great difference in torque required to rotate shafts 10 and 27. Because of the constant speed characteristics of motor 9, and the mass and dynamic friction of the antenna rotating mechanism a comparatively large torque is required to rotate or modify the speed of shaft 10. On the other hand the rotor of synchro 21 which is driven by shaft 27 may be very easily turned. Therefore, the entire motion of gear 31 is transmitted to shaft 27 and none to shaft 10.

The gear 31 is driven by two-phase motor 33 through gears 34 and 35. Worm 34 further serves to lock gear 31 against rotation by shaft 10. The ratio of gears 35 and 31 is 2:1. Since the ratio of shaft 27 to gear 31 is also 2:1 rotation of gear 31 produces equal but opposite rotations of shafts 27 and 36. However, since the radial sweep of tube 15 rotates in the opposite direction to shaft 27, as already pointed out, rotation of gear 31 results in rotation of the sweep and shaft 36 in the same direction through equal angles.

The motor 33 has a fixed phase winding 37 and a variable phase winding 38 in which the current either leads or lags that in winding 37 by 90°, to produce rotation in one direction or the other. The fixed phase winding 37 is connected directly to a source of alternating current while the variable phase winding is connected through phase reversing relay and center tapped transformer 39—40 and through 90° phase shifter 41 to the same source of alternating current. The direction of rotation of motor 33 is determined by whether relay 39 is in its upper or lower position. When relay 39 is in neutral position the winding 38 is not energized and the motor does not rotate.

The directional standard for stabilizing the azimuth is provided by compass 30 which may be of any suitable type wherein the movable element rotates the rotor winding 42 of a synchro generator having stator windings 43, 44 and 45. The rotor winding is energized from the common source of alternating current while the stator windings are connected to the stator windings 46, 47 and 48 of synchro 49. The rotor winding 50 of synchro 49 is rotated by shaft 36. The direction of the magnetic flux produced by windings 46, 47 and 48 is determined by the heading of the airplane as compared with the reference direction established by the compass, which in this case, is assumed to be magnetic north.

When rotor winding 50 of synchro 49 is at right angles to the flux produced by stator windings 46, 47 and 48 no voltage is induced therein, but for positions to the right or left of this position voltages of opposite phase are induced in winding 50. This voltage, after amplification, is applied to transformer 51 which is part of a phase sensitive rectifier circuit comprising in addition transformer 52 and rectifiers 53 and 54. The load circuit for the rectifier is the center tapped coil of polarized relay 39. The circuit functions to operate relay 39 to one contact or the other depending upon the relative phase of the alternating voltages applied to the primaries of transformers 51 and 52. Since these two voltages are obtained from the same source of alternating current and are subjected only to phase shifts of 0° or 180° the phase difference therebetween at any time must be either 0° or 180°. Further, since the phases of the voltages in the two halves of the center-tapped secondary winding of transformer 51 are 180° different, the voltage across the secondary of transformer 52 must at all times be in phase with one of these voltages and in phase opposition to the other.

When the voltage induced in winding 50 is zero the only voltage applied to the rectifiers is that from the secondary of transformer 52. This causes equal current to flow in opposite directions through the upper and lower halves of the relay coil so that the resultant flux is zero and the relay armature is in its neutral or center position. However, in the presence of a voltage from winding 50, each rectifier has two voltages applied to it, one from the secondary of transformer 52 and the other from one-half of the secondary of transformer 51, and for one of the rectifiers these voltages are in the same phase while for the other rectifier they have opposite phases. Therefore, the rectifier connected in series with the two in-phase voltages will have the greater output current and the resultant flux due to the inequality of the rectifier currents actuates relay 39 causing rotation of motor 33.

In order to initially align the system, the azimuthal direction in which the antenna 8 is pointing is first determined. Then with the phase sensitive relay deenergized by opening switch 55 the relay 39 may be hand operated to rotate motor 33 in the proper direction to adjust the sweep direction, through differential gear 28, until its azimuth, referred to the azimuth scale surrounding the screen of the cathode-ray tube (Fig. 3) is 180° different from that of the antenna referred to the same scale. The rotor winding 50 is then rotated relative to gear 35, by means of the adjustable coupling 56, for example, until the voltage across the terminals of winding 50 is zero. The switch 55 may then be reclosed and the azimuth stabilizing system will function in response to a change in heading of the airplane to rotate the sweep relative to the antenna through an angle equal in magnitude and direction to the change in heading.

The manner in which the above is accomplished may be seen from an example: Assume that the airplane should change its heading from that shown in Fig. 2 to magnetic north. Since the cathode-ray indicator tube, the map and azimuth scale attached thereto, and the antenna, are all mounted on the airplane they are rotated through a clockwise angle of 60°. This would cause the antenna beam to intercept the ground beacon 60° earlier in its rotational cycle which, in the absence of any compensation for the change in heading, would cause the sweep direction, when the antenna is pointed at the beacon, to be 60° counterclockwise from the position shown in Fig. 3, since the direction of the sweep is fixed relative to the antenna for any fixed position of gear 31. This would give an erroneous indication of the position of the airplane on the map overlay since the azimuth of the airplane relative to the beacon has not changed. The azimuth stabilizing mechanism prevents this error by rotating the sweep 60° clockwise relative to the antenna so that the sweep direction relative to the map remains as shown in Fig. 3. This correction is caused by a 60° change in the direction of the flux produced by winding 42 of the compass synchro generator relative the stator windings thereof which further results in an equal change in the direction of the flux produced by stator windings 46, 47 and 48 of synchro 49. The resulting voltage induced in winding 50 causes motor 33 to rotate until the winding is again at right angles to the direction of flux and the voltage induced therein is zero. While rotating winding 50 through 60° the motor also acts through differential gear 28 to rotate the sweep through a clockwise angle of 60° relative to the antenna, thus maintaining the sweep in its proper position relative to the map.

In order to provide a continuous indication of the heading of the airplane on the map the cam 60, Fig. 1, is attached to shaft 10 and arranged to close a pair of contacts 61 once during each revolution of the antenna. When the contacts are closed a pulse is applied through video amplifier 12 to grid 14 to unblank the beam for two or three sweeps so that a radial line is formed on the screen of the tube in the direction in which the airplane is heading. The position of the cam on shaft 10 is such that the contacts 61 are closed when the antenna is pointed 180° from the heading of the airplane. This 180° relationship is necessary because of the fact that the sweep direction of the electron beam is 180° from the direction of the antenna, as already explained. The line indicating the heading is referred to as the lubber line in Fig. 3.

The described navigational system is suitable for both precise local navigation, such as in the vicinity of an airport, or for cross-country navigation. For local navigation the scale of the map overlay is made relatively large and the range of the search radar relatively short. For cross-country navigation a series of ground beacons are located along the desired course and the navigator is provided with a map overlay for each beacon. The range of the search radar in this case is made relatively large and the scale of the maps relatively small. A slight overlap of the defined areas about adjacent beacons is provided so that the position of the airplane is always apparent on one of the map overlays.

We claim:

1. A navigational system for airplanes comprising search radar apparatus on said airplane and a cooperating radar repeater station on the ground, said search radar apparatus comprising a directional antenna, means for applying short periodically occurring pulses of high frequency energy to said antenna for radiation thereof into space for reception and reradiation by said repeater station, a plan position indicator comprising a cathode-ray tube having a beam intensity control electrode, means biasing said control electrode beyond the beam cut-off point, means for receiving pulse signals radiated by said repeater station and for applying same to the beam intensity control electrode of said tube in opposition to said bias, means for producing one radial sweep of said beam from the center of the screen of said cathode-ray tube for each pulse radiated by said antenna and for initiating said sweep at the instant of radiation, a map overlay of the area surrounding said repeater station placed over and fixed relative to the screen of said tube with the location of said repeater station on said map in register with the center of said screen, means for rotating said antenna at constant speed about a vertical axis, means for rotating the radial sweep of said tube, a coupling between said antenna rotating means and said sweep rotating means for rotating said sweep at the same speed as said antenna, means associated with said coupling for introducing an angular displacement of each sweep relative to said antenna equal in magnitude and sense to the azimuth of a predetermined reference direction as plotted on said map overlay relative to said predetermined reference direction on earth plus 180 degrees with the result that the direction of each sweep is opposite to the instantaneous direction of said antenna as plotted on said map overlay.

2. A navigational system for airplanes comprising search radar apparatus on said airplane and a cooperating radar repeater station on the ground, said search radar apparatus comprising a directional antenna, means for applying short periodically occurring pulses of high frequency energy to said antenna for radiation thereof into space for reception and reradiation by said repeater station, a plan position indicator comprising a cathode-ray tube having a beam intensity control electrode, means biasing said control electrode beyond the beam cut-off point, means for receiving pulse signals radiated by said repeater station and for applying same to the beam intensity control electrode of said tube in opposition to said bias, means for producing one radial sweep of said beam from the center of the screen of said cathode-ray tube for each pulse radiated by said antenna and for initiating said sweep at the instant of radiation, a map overlay of the area surrounding said repeater station placed over and fixed relative to the screen of said tube with the location of said repeater station on said map in register with the center of said screen, means for rotating said antenna at constant speed about a vertical axis, means for rotating the radial sweep of said tube, a coupling between said antenna rotating means and said sweep rotating means for rotating said sweep at the same speed as said antenna and for establishing a predetermined angular relation between the direction of said sweep and the direction of said antenna, and means associated with said coupling and controlled by the heading of said airplane for maintaining said predetermined angular relation at such value that the sweep direction is always opposite to the instantaneous direction of the antenna as plotted on said map overlay.

3. Apparatus as claimed in claim 2 in which means are provided for momentarily unblanking the beam of said cathode-ray tube each time said antenna is pointing in a direction opposite to the heading of said airplane for producing a lubber line on the screen of said cathode ray tube.

References Cited in the file of this patent

UNITED STATES PATENTS

| | | |
|---|---|---|
| 2,421,747 | Engelhardt | June 10, 1947 |
| 2,428,427 | Loughren | Oct. 7, 1947 |
| 2,448,016 | Busignies | Aug. 31, 1948 |
| 2,489,251 | Anast | Nov. 29, 1949 |
| 2,490,268 | Herbst | Dec. 6, 1949 |
| 2,517,752 | Wolff | Aug. 8, 1950 |
| 2,528,202 | Wolff | Oct. 31, 1950 |
| 2,539,901 | Ewing | Jan. 30, 1951 |
| 2,543,002 | Deloraine | Feb. 27, 1951 |
| 2,546,970 | Busignies | Apr. 3, 1951 |
| 2,566,332 | Huber et al. | Sept. 4, 1951 |
| 2,573,021 | Higinbotham | Oct. 30, 1951 |

FOREIGN PATENTS

| | | |
|---|---|---|
| 591,322 | Great Britain | Aug. 14, 1947 |